Sept. 24, 1968

T. G. HART 3,402,921

APPARATUS AND METHOD OF MAKING APPARATUS
FOR VACUUM PURIFICATION OF METALS

Filed Aug. 30, 1965

INVENTOR.
THOMAS G. HART

BY

ATTORNEYS.

Sept. 24, 1968 T. G. HART 3,402,921
APPARATUS AND METHOD OF MAKING APPARATUS
FOR VACUUM PURIFICATION OF METALS
Filed Aug. 30, 1965 6 Sheets-Sheet 2

INVENTOR.
THOMAS G. HART
BY
Davis, Hoxie, Faithfull & Hapgood
ATTORNEYS.

INVENTOR.
THOMAS G. HART

INVENTOR.
THOMAS G. HART
BY
Davis, Hoxie, Faithfull & Hapgood
ATTORNEYS.

United States Patent Office 3,402,921
Patented Sept. 24, 1968

3,402,921
APPARATUS AND METHOD OF MAKING APPARATUS FOR VACUUM PURIFICATION OF METALS
Thomas Gordon Hart, San Francisco, Calif., assignor to Phelps Dodge Corporation, New York, N.Y., a corporation of Delaware
Filed Aug. 30, 1965, Ser. No. 483,601
27 Claims. (Cl. 266—34)

ABSTRACT OF THE DISCLOSURE

Vacuum treatment apparatus is constructed from solid blocks of a refractory such as graphite. The blocks are so shaped that when interfitted, they cooperate to form reservoirs, feedpaths, and exposure chambers.

---

This invention relates generally to the purification of metals and particularly to the removal of gases and other impurities from molten metals by vacuum treatment. More particularly, this invention relates to the vacuum treatment of nonferrous metals such as copper.

Vacuum treatment, in the present connotation, is the process of exposing molten metal to a gas pressure which is very low as compared to atmospheric pressure. It is of course well known in the metal purification art that vacuum treatment removes gases and volatile impurities from molten metals.

Broadly, the invention comprises means for continuously vacuum treating a stream of molten metal. Hence, for example, apparatus in accordance with the invention may be interposed between a furnace which continuously melts metal and a casting unit which continuously cools and resolidifies the metal so as to continuously vacuum treat the metal between continuous melting and continuous casting. Broad advantages of the invention over prior art are in the simplicity of construction and economy and efficiency of operation.

The most simple conventional apparatus for vacuum treatment comprises merely a heated open top vessel for containing molten metal, a sealed enclosure around the vessel and a pump for exhausting gas from the enclosure so as to create and maintain a very low gas pressure above the molten metal. It is well known that this simple vacuum treatment apparatus has two prime disadvantages; in the first place the purification action is very slow and in the second place this simple apparatus vacuum treats molten metal only a batch at a time. It is further well known that conventional means are available for overcoming these two disadvantages, these conventional means being based on the two principles that, firstly, agitation of the molten metal quickens the vacuum purification action and that, secondly, a low pressure enclosure can be fed and discharged via "pressure-locks" without disturbing the pressure conditions inside the enclosure. This is to say, vacuum treatment apparatus which achieves relatively high treatment rates in continuous operation is within the state of conventional art. However, such conventional, continuous vacuum treatment apparatus although widely known in principle has not reached practical fruition for treating nonferrous metals on a commercial scale because of its complexity. This complexity is compounded by the unusual combination of high temperatures, temperature gradients, pressure gradients and corrosive and erosive actions commonly encountered in vacuum treating molten metals.

A broad purpose of the present invention is accordingly to provide commercial means for the continuous, rapid vacuum treatment of molten metals particularly nonferrous metals considerably less complex than means already known or obvious to those skilled in the art.

Another broad purpose of the present invention is to provide more economic commercial means for vacuum treating molten metals, particularly nonferrous metals, than available hitherto. Yet another broad purpose of the present invention is to provide means for purifying molten metals, particularly nonferrous metals, to a greater extent than hitherto.

Somewhat narrower purposes of the present invention are as follows:

First, to provide less complex, more economic and more efficient apparatus for vacuum treating molten copper;

Second, to provide apparatus for vacuum treating molten copper which is particularly adapted to molten copper containing dissolved hydrogen;

Third, to provide forms of apparatus for vacuum treating molten copper in which the heat losses are minimal;

Fourth, to provide forms of apparatus for vacuum treating molten copper in which the ratio of surface exposure to volumetric flow is maximal;

Fifth, to provide forms of apparatus for vacuum treating molten copper which are simple to construct, simple to use and simple to maintain;

Sixth, to provide forms of apparatus for vacuum treating molten copper in which the design difficulties due to pressure gradients, temperature gradients and corrosive effects are minimized;

Seventh, to provide forms of apparatus for vacuum treating molten copper in which some porosity in the construction material can be tolerated; and Eighth, to provide apparatus for vacuum treating molten copper in which the constructional material in contact with the molten copper and subject to molten copper temperatures is substantially entirely graphite.

An understanding of these above various purposes of the present invention and how they are accomplished will be gained from the following descriptions and drawings of which:

As already mentioned in the introduction the combination of hostile conditions met in molten metal vacuum treatment apparatus creates many unusual design difficulties. These hostile conditions include high temeratures, high temperature gradients, pressure gradients and corrosive effects of molten metals. The design difficulties are due mainly to the fact that constructional materials which are capable of withstanding all these hostile conditions simultaneously are, generally speaking, unavailable. Consequently, in those parts of typical, conventional vacuum treatment apparatus where these hostile conditions apply simultaneously, special contrivances involving combinations of materials are generally required to surmount the difficulties. An appreciation of how these hostile conditions cause difficulty in the design of molten metal vacuum treatment apparatus and of how these difficulties may be overcome will be gained from the following comparison between a "cold" vacuum treatment apparatus and a "hot" vacuum treatment apparatus.

Figure 1:
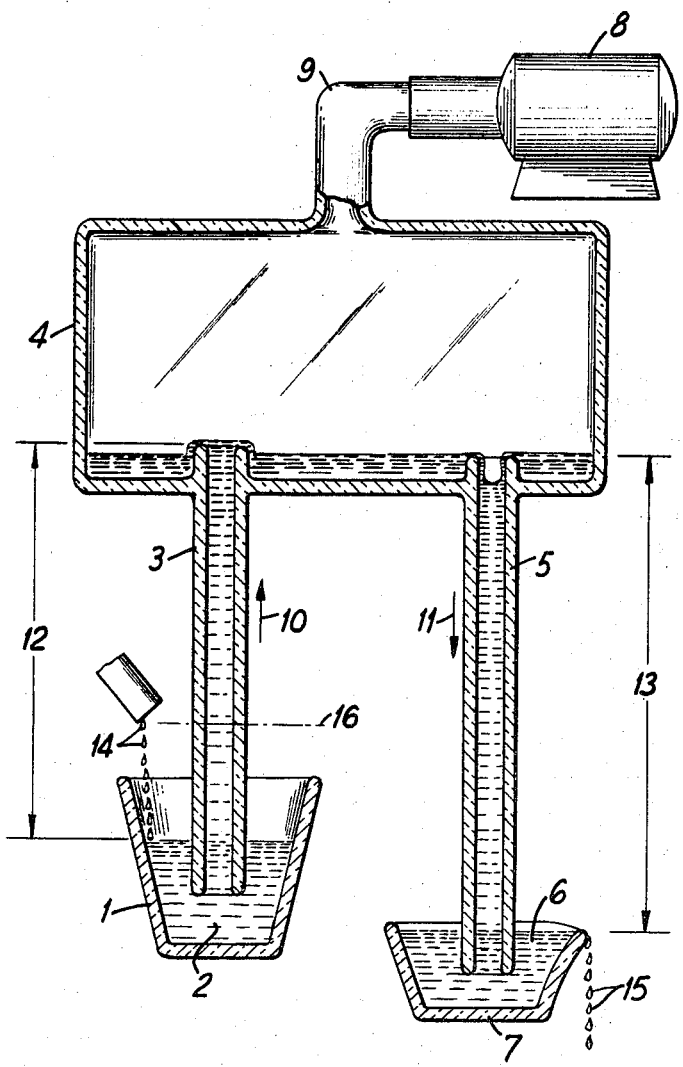
FIGURE 1 illustrates "cold" vacuum treatment apparatus of the "detached reservoir" type.

Attention is now directed to FIGURE 1 which illustrates an apparatus for cold vacuum treatment of mercury. The apparatus of FIGURE 1, which is not, so far as is known, in practical use because other well-known means for purifying mercury are far more effective, is conventional in the sense that the apparatus involves nothing novel or unobvious. With reference to FIGURE 1, 1 is a reservoir for unpurified mercury 2, 3 is a tube extending from below the mercury 2 in reservoir 1 up into enclosure 4, 5 is a tube extending from enclosure 4 down to below the surface of purified mercury 6 in reservoir 7, 8 is a vacuum pump and 9 is a tube connecting vacuum pump 8 to enclosure 4. The entire apparatus of FIGURE 1 with the exception of vacuum pump 8 is, for example, made of glass. As indicated in FIGURE 1 by arrows 10 and 11 mercury flows from reservoir 1 up tube 3 along the bottom of enclosure 9 down tube 5 into reservoir 7. This mercury flow, is of course, due to the pressure differences between atmospheric pressure acting on the mercury in reservoirs 1 and 7 and the very low pressure, relative to atmospheric pressure, acting on the mercury in enclosure 4 and maintained by vacuum pump 8. The height 12 of tube 3 and the height 13 of tube 5 are, of course, respectively less than and greater than the mercury column equivalent of the aforementioned pressure difference. That is to say, assuming the pressure in enclosure 4 to be the equivalent of 1 mm. of mercury and the atmospheric pressure to be 760 mm. of mercury, height 12 is less than 759 mm. and height 13 is more than 759 mm. So that as mercury flows out of reservoir 1 and into reservoir 7 heights 12 and 13 do not change, reservoir 1 is shown to be continuously replenished by drops 14 and reservoir 7 is shown to be continuously depleted by overflowing into drops 15. With such continuous replenishment and depletion of reservoirs 1 and 7 respectively, it will be easily understood that the flow of mercury through enclosure 4 is also continuous.

It will by now be understood that the glass apparatus of FIGURE 1 constitutes means for exposing mercury to a very low gas pressure, as compared to atmospheric pressure, in a continuous "flow-through" fashion and in this sense constitutes apparatus for continuous vacuum treatment of mercury. Also it will by now be equally understood, setting aside for the moment the purification efficiency of such apparatus, that apparatus such as in FIGURE 1 could quite well serve to vacuum treat metals other than mercury if kept hot enough to maintain these other metals molten. For example, by heating the whole of the glass apparatus of FIGURE 1 in an oven which enclosed all but the vacuum pump 8, any metal which was molten at a temperature below the "softening" point of glass could be vacuum treated provided the molten metal did not attack the glass and provided heights 12 and 13 were appropriately adjusted. Of course, by using a different material such as fused quartz instead of glass to construct the apparatus of FIGURE 1 the maximum temperature of use of the apparatus could be considerably extended. Hence, in the limit, providing suitable constructional materials were available, apparatus such as in FIGURE 1 would be capable of vacuum treating metals without reservation as to melting point. Unfortunately, for vacuum treating metals with melting points above 800° C. such suitable constructional materials for constructing apparatus such as in FIGURE 1 are either unavailable or are prohibitively expensive, assuming the apparatus is to be of a size appropriate to commercial use. In the case of copper, for example, which melts at about 1080° C., only refractory metals such as molybdenum, tantalum and tungsten show any practical possibility of yielding an apparatus such as in FIGURE 1 for vacuum treating molten copper, assuming that the entire apparatus is to be maintained above 1080° C. At the present time, these refractory metals are not commercially available in forms and sizes suitable for constructing apparatus such as in FIGURE 1 of a size that would be commercially useful. Further, if these refractory metals were to become available in suitable forms and sizes they would likely be extremely expensive. However this expensiveness might not be an impediment if the apparatus constructed from them would be reliable and long lived. This is to say, if these refractory metals would retain good mechanical properties over a long period of time despite high temperatures and despite alternations between high and low temperatures and if, furthermore, these refractory metals would be substantially completely unaffected by the molten metals with which they would be used and by impurities contained therein, then high initial cost of the apparatus might be amply justified. That these refractory metals or alloys thereof could have long lived retention of mechanical properties and immunity to corrosion at elevated temperatures remains to be proven but the possibility cannot be ruled out and hence an apparatus such as in FIGURE 1 constructed of refractory metal or metal alloy instead of glass while not presently practical in commercial size is perhaps a future possibility for vacuum treating metals such as copper. It is to be noted of course that since refractory metals, such as molybdenum and columbium oxidize rapidly in air at elevated temperatures it would be necessary to surround such heated refractory metal apparatus with inert atmosphere, such as nitrogen.

Figures 2, 3:
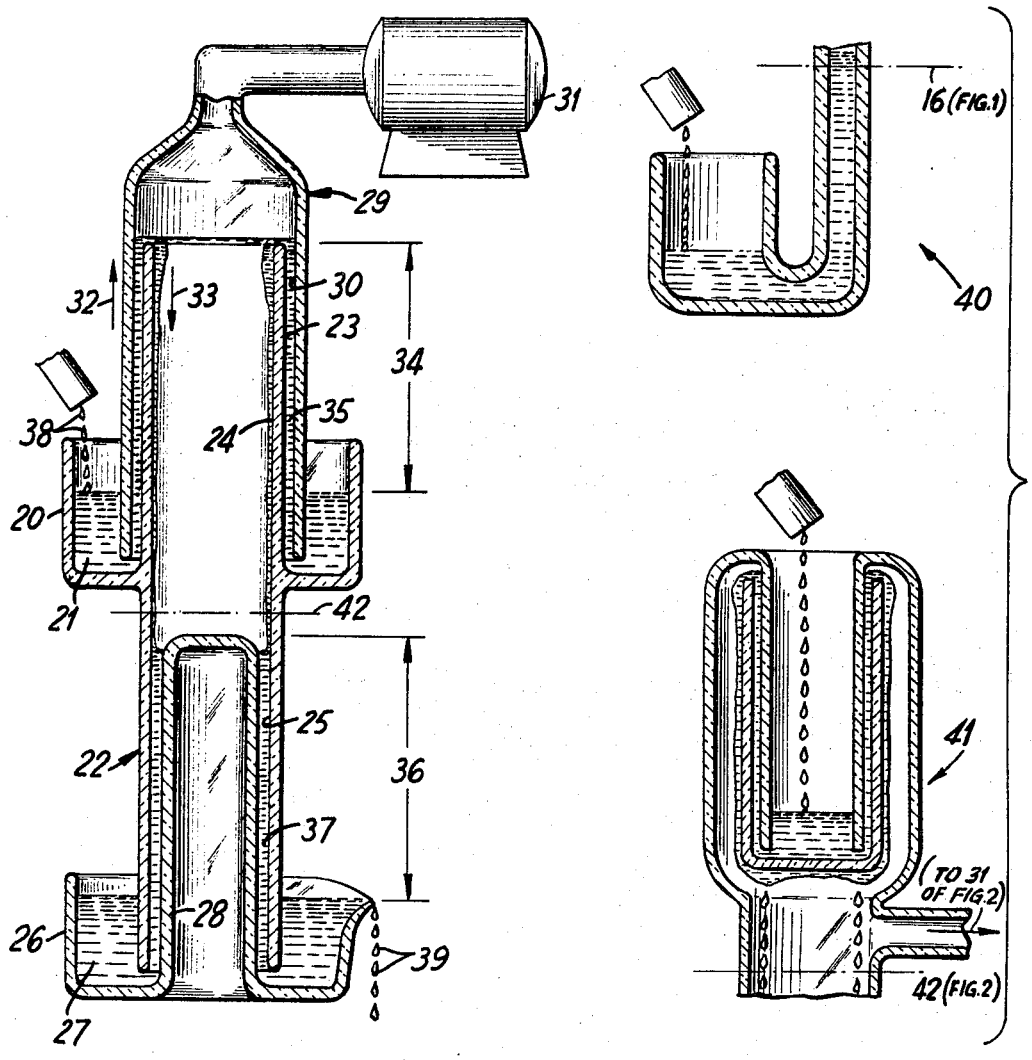
FIGURE 2 illustrates "cold" vacuum treatment apparatus of the "external reservoir" type.
FIGURE 3 illustrates U-tube and internal reservoir arrangements for "cold" vacuum treatment apparatus.

It will by now be understood that the "cold" vacuum treatment apparatus of FIGURE 1 could, by use of an appropriate constructional material such as refractory metal and, additionally by provision of heating means such as an enclosing oven, be adapted in straightforward manner to vacuum treating metals with high melting points such as copper. However, it will also by now be understood that appropriate constructional materials are not presently available in suitable form and size at prohibitive cost and that the mechanical stamina and corrosibility of these materials in prolonged vacuum treatment use are largely unknown. Consequently, it will be understood that straightforward adaptation of the apparatus of FIGURE 1 for use in vacuum treating metals such as copper while conceivable is not presently practical and that, accordingly, more practical at present is the unstraight adaption of the apparatus of FIGURE 1 as by using combinations of constructional materials, special constructional techniques and by heating the apparatus selectively in parts rather than as a whole. Thus, for example, in unstraightforward adaptation of the apparatus of FIGURE 1, enclosure 4 might conveniently be of different material from tubes 2 and 5 in order to accommodate the different pressure, temperature and corrosion conditions encountered and this use of different materials for tubes 2 and 5 and enclosure 4 would of course require special provision for joining tubes 2 and 5 into enclosure 4 taking into account such differences an different thermal expansions. Further, for example, tubes 2 and 5 might themselves conveniently be composed of two parts each of different material, an outer shell of material having mechanical strength at expense of high corrosibility and an inner lining of material having low corrosibility at expense of low mechanical strength. Yet further, for example, tube 2 might conveniently discharge not into the base of enclosure 4, as in FIGURE 1, but into a heated vessel contained within enclosure 4, thus avoiding the necessity of directly heating enclosure 4 itself. Such possibilities as the preceding examples, for adapting the apparatus of FIGURE 1 in unstraightforward fashion so as to mitigate the requirement for construction materials which can simultaneously withstand high pressure and temperature gradients, high temperatures and extreme corrosive effects, are of course innumerable and will be more or less obvious to those skilled in the vacuum treatment art. Equally obvious to those skilled in the vacuum treatment art will be the general fact that such conventional unstraightforward adaptation of the apparatus of FIGURE 1, although open to wide choice of materials and techniques, unavoidably results in apparatus of considerable complexity. Further obvious to those skilled in this art will be that the unavoidable complexity that results from adapting the apparatus of FIGURE 1 in unstraightforward fashion so as to allow "hot" vacuum treatment of molten metals such as copper may in some part be due to the geometric form and arrangement of the apparatus of FIGURE 1. Accordingly, it would readily occur to those skilled in the art that "cold" vacuum treatment apparatus broadly similar to the apparatus of FIGURE 1 but having a different geometric arrangement might be more suitable for unstraightforward adaptation to hot vacuum treatment purposes. In this connection attention is now directed to FIGURE 2 which illustrates a continuous vacuum treatment apparatus broadly similar to the apparatus of FIGURE 1. Like the conventional apparatus of FIGURE 1, the apparatus of FIGURE 2 is for cold vacuum treatment of liquid materials such as mercury. It is to be understood, of course, as previously, that "cold" vacuum treatment of liquids such as mercury is a concern of the present invention mainly insofar as "cold" vacuum treatment apparatus adapts into "hot" vacuum treatment apparatus and insofar as discussion of the former serves as a simple basis for discussion of the latter.

With reference to FIGURE 2, 20 is a circular input reservoir for untreated mercury 21, 22 is a tube extending through the base of reservoir 20 having an upper outer surface 23, an upper inner surface 24 and a lower inner surface 25, 26 is a circular output reservoir for treated mercury 27, 28 is a central spigot extending upward from the base of reservoir 26 into the lower portion of tube 22, 29 is a tube having an inner surface 30 enveloping the upper portion of tube 22 and 31 is a vacuum pump connected to tube 29. The entire apparatus of FIGURE 2, with the exception of vacuum pump 31 is, for example, made of glass.

As indicated in FIGURE 2 by arrows 32 and 33 mercury flows from reservoir 20 up the annular gap between outer surface 23 of tube 22 and inner surface 30 of tube 29, down inner surface 24 of tube 22, through the annular gap between lower inner surface 25 of tube 22 and spigot 28 and into output reservoir 26. This mercury flow is of course due to the pressure difference between atmospheric pressure acting on the mercury in reservoirs 20 and 26 and the very low pressure, relative to atmospheric pressure, acting on the mercury within tubes 22 and 29 and maintained by vacuum pump 31. The height 34 of the input annular gap 35 and the height 36 of the output annular gap 37 are, of course, respectively less than and greater than the mercury column equivalent of the aforementioned pressure difference. That is to say, assuming for example the pressure in tubes 22 and 29 to be the equivalent of 1 mm. of mercury and the atmospheric pressure to be 760 mm. of mercury, height 34 is less than 759 mm. and height 36 is greater than 759 mm. So that as mercury flows out of reservoir 20 and into reservoir 26 heights 34 and 36 do not change, reservoir 20 is shown to be continuously replenished by drops 38 and reservoir 26 is shown to be continuously depleted by overflowing into drops 39. With such continuous replenishment and depletion of reservoirs 20 and 26 respectively, it will be apparent that the flow of mercury though the apparatus is also continuous.

It will now be clear that the glass apparatus of FIGURE 2 performs exactly the same function as the glass apparatus of FIGURE 1 and in substantially identical fashion. However it will also by now be clear that the geometrical form and arrangement of the apparatus of FIGURE 2 is quite different from the apparatus of FIGURE 1. The most notable difference is the annular feeding and discharging arrangement of the apparatus of FIGURE 2 as opposed to the tubular feeding and discharging arrangement of the apparatus of FIGURE 1. It will be apparent that the apparatus of FIGURE 2 is much more compact that the apparatus of FIGURE 1 for the same area of exposure of the liquid to the low pressure and hence that the apparatus of FIGURE 2 lends itself much more readily to being compactly heated, for example, by being enclosed in a cylindrical oven. Hence, in straightforwardly adapting the apparatus of FIGURE 2 to the "hot" vacuum treatment of metals such as copper by using refractory metal rather than glass as the constructional material, as earlier proposed for straightforwardly adapting the apparatus of FIGURE 1, it is easily understood that a more compact "hot" vacuum treatment apparatus would be derived from apparatus of FIGURE 2. Not yet clear are the advantages offered by the apparatus of FIGURE 2 for unstraightforward adaptation to "hot" vacuum treatment purposes, for metals such as copper, out of presently available and relatively inexpensive materials.

Figure 4:
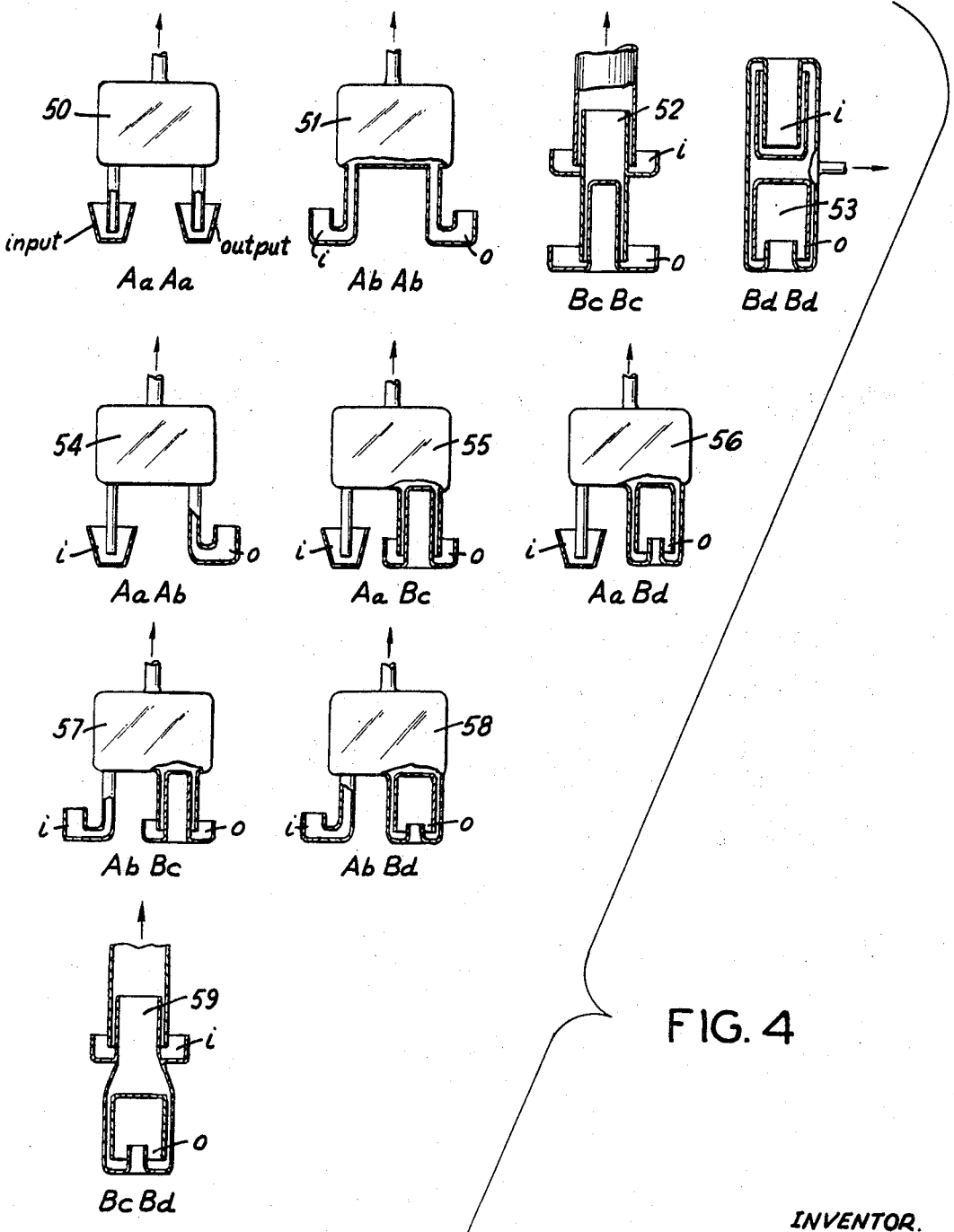
FIGURE 4 is a series of diagrammatic outlines of various "cold" vacuum treatment apparatuses.

However, before further enlarging upon the influence of the geometrical form of "cold" vacuum treatment apparatus upon the difficulties of unstraightforwardly adapting this apparatus to "hot" vacuum treatment purposes, it must be pointed out that in addition to the apparatus of FIGURE 1 and the apparatus of FIGURE 2 there are numerous other geometrical forms of broadly similar "cold" vacuum treatment apparatus which are either well known or obvious. In this connection attention is now directed to FIGURES 3 and 4. FIGURE 3 illustrates in cross-sectional view two further reservoir arrangements different from the arrangements in FIGURES 1 and 2. With reference to FIGURES 1, 2 and 3 it will be apparent that the reservoir arrangement 40 of FIGURE 3 could well replace the input reservoir arrangement of FIGURE 1 (being attached below line 16 in FIGURE 1) and that reservoir arrangement 41 of FIGURE 3 could well replace the input reservoir arrangement of FIGURE 2 (being attached above line 42 in FIGURE 2). FIGURE 4 illustrates in diagrammatic outline some of the numerous apparatuses, including those of FIGURES 1 and 2 for comparative purposes, which may be derived from the four different reservoir arrangements shown in FIGURES 1, 2 and 3.

In order to identify the various apparatuses of FIGURE 4 and other apparatuses not shown in FIGURE 4 but related to those in FIGURE 4, I use below terminology which in some cases is familiar in this art but which in other cases I have had to choose somewhat arbitrarily. I use the word "tubular" to identify the type of feed shown in FIGURE 1 and in item 40 of FIGURE 3, and the word "annular" to identify the type of feed shown in FIGURE 2 and in item 41 of FIGURE 3. The types of reservoir shown in connection with tubular feed, that is, those in FIGURE 1 and in item 40 of FIGURE 3, I call "detached" and "U-tube" respectively. I use the term "detached" with regard to the reservoir of FIGURE 1 because it is detached or separated from the tubular feed, as distinguished from the U-tube reservoir, which is an attached extension of the tubular feed. The types of reservoirs shown in connection with annular feed, that is, those in FIGURE 2 and in item 41 of FIGURE 3, I call "external" and "internal," respectively, to signify in the case of FIGURE 2 that the reservoir is external with respect to the feed path and in the case of item 41 that the reservoir is internal with respect to the feed path.

This terminology becomes somewhat cumbersome, however when it is necessary to discuss the various combinations of feed paths and reservoirs which are useful according to my invention. I have therefore found it convenient to designate the types of feed and types of reservoirs by letters. Thus tubular feed is designated "A" and annular feed "B." A detached reservoir is designated "$a$," a U-tube reservoir "$b$," an external reservoir "$c$," and an internal reservoir "$d$." Accordingly, the apparatus of FIGURE 1 is named "tubular feed and detached reservoir input with tubular feed and detached reservoir output" and is designated A$a$A$a$, the apparatus of FIGURE 2 is named "annular feed and external reservoir input with annular feed and external reservoir output" and is designated B$c$B$c$, and accordingly also the various apparatuses 50 through 59 of FIGURE 4 are designated respectively A$a$A$a$, A$b$A$b$, B$c$B$c$, B$d$B$d$, A$a$A$b$, A$a$B$c$, A$a$B$d$, A$b$B$c$, A$b$B$d$, B$c$B$d$ and are named correspondingly. It will be apparent that by interchanging the input and output reservoir arrangements of apparatuses 54 through 59 of FIGURE 4, six additional apparatuses are created, designated, respectively, A$b$A$a$, B$c$A$a$, B$d$A$a$, B$c$A$b$, B$d$A$b$, B$d$B$c$ and named correspondingly. Consequently, it will be understood that at least sixteen distinctive vacuum treatment apparatuses may be devised from the four types of reservoir arrangement shown in FIGURES 1, 2 and 3 and that these sixteen apparatuses are named and designated in unambiguous fashion as explained above. For simplicity the apparatuses of FIGURE 4 are shown without their respective vacuum pumps, the connections thereto being indicated in each case by an arrow. Further for simplicity the apparatuses of FIGURE 4 are shown empty, the input and output reservoirs being indicated in each case by "$i$" and "$o$" respectively. In view of the previous descriptions of the manner of operation of the apparatuses of FIGURES 1 and 2 (50 and 52 in FIGURE 4) the manner of operation of all the apparatuses of FIGURE 4, as well as those not included in FIGURE 4 but mentioned above, will be apparent without further description since the barometric principles of operation of all the apparatuses are identical.

Each of the sixteen "cold" vacuum treatment apparatuses mentioned above in relation to FIGURE 4 could of course be straightforwardly adapted to "hot" vacuum treatment purposes in the manner earlier proposed for the apparatuses of FIGURES 1 and 2 which is to say by constructing each out of refractory metal and enclosing each in an oven. However, as already has been pointed out, to so construct a commercial size "hot" vacuum treatment apparatus out of refractory metals is, at the present time at least, impractical in view of the expense and uncertainties over properties in prolonged hot vacuum use of these refractory metals. Furthermore, each of the sixteen apparatuses mentioned above could of course be unstraightforwardly adapted to "hot" vacuum treatment purposes in a large variety of manners some of which were mentioned by way of example in connection with the apparatus of FIGURE 1. As has already been pointed out, the difficulties of such unstraightforward adaptation depend somewhat on geometrical form of the apparatus being adapted and it is already understood therefore that some of the sixteen apparatuses mentioned above may have advantages over some other of the apparatuses depending of course on the particular manner of adaptation. The task of evaluating in a general way the respective merits of the above-mentioned sixteen "cold" vacuum treatment apparatuses with view to unstraightforward adaptation to "hot" vacuum treatment purposes is, it will be readily understood, indeed a formidable one so numerous are the considerations involved. Attention is therefore henceforth herein confined to discussion of the above mentioned sixteen "cold" vacuum treatment apparatuses insofar as is concerned the unstraightforward adaptation of these apparatuses to "hot" vacuum treatment purposes in the manner of the present invention. This novel manner of unstraightforward adaptation of "cold" vacuum treatment apparatus to "hot" vacuum treatment purposes comprises constructing the apparatus for the most part out of one or more blocks such as cylindrical blocks of refractory material such as compacted graphite and will now be described.

Attention is now directed to FIGURES 5, 6, 7, 8, 9 and 10 which are either cross-sectional or transparent views, as appropriate for clarity, of adaptation in accordance with the present invention of six of the above mentioned sixteen vacuum treatment apparatuses. The six adaptations of FIGURES 5–10 are thought to be representative enough to clearly illustrate how any of the remaining ten apparatuses may also be adapted in accordance with the present invention. For present descriptive purposes the apparatuses of FIGURES 5–10 may be understood to be for "cold" vacuum treatment of liquids such as mercury, it being shown later how the adaptation to "hot" vacuum treatment purposes for molten metals such as molten copper is accomplished. As in the case of the diagrammatic illustrations of FIGURE 4, for simplicity no vacuum pumps are shown in FIGURES 5–10, the connections thereto being indicated by an arrow and the apparatuses are shown in empty condition, the input and output reservoirs being indicated by "($i$)" and "($o$)" respectively. For brevity in the descriptions the reservoirs in FIGURES 5–10 are indicated by the letters "$a$" or "$b$" or "$c$" or "$d$" according to the type of reservoir, in conformance with the designations previously discussed in connection with FIGURE 4, and the feed paths by which the liquid material circulates from the input reservoir to the exposure surface and thence to the output reservoir are indicated by the letters "A" or "B" according to the type of path also in conformance with the previously discussed designations. For example FIGURE 5 which shows an apparatus of type A$a$A$a$ has an input reservoir of the detached type and therefore marked "$a$," a path leading from the input reservoir to the exposure chamber of the tubular type and therefore marked "A," an output reservoir of the detached type and therefore marked "$a$" and a path leading from the exposure chamber to the output reservoir of the tubular type and therefore marked "A."

Figure 5:
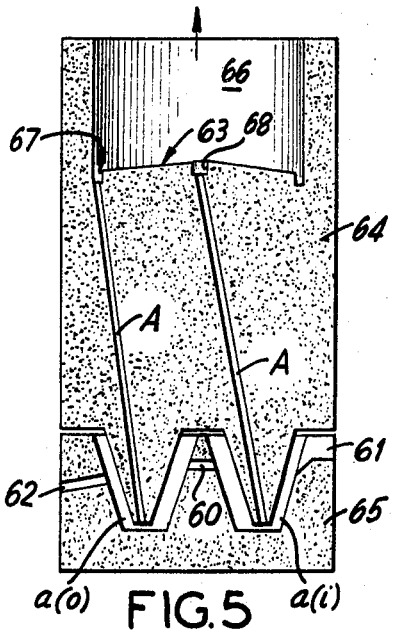
FIGURES 5, 6, 7, 8, 9 and 10 are a series of cross-sectional and other views of "cylindrical block" adaptation some of the apparatus forms of FIGURE 4 in accordance with the present invention.

With reference to FIGURE 5, illustrated in cross-sectional view is a vacuum treatment apparatus in accordance with the present invention of type A$a$A$a$ which is to say identical in respect of types of reservoirs and feed paths with apparatus 50 of FIGURE 4 which, in turn, is a diagrammatic representation of the apparatus of FIGURE 1. Hence it will be understood that the manner of operation of the apparatus of FIGURE 5 insofar as is concerned the means by which liquid material is circulated through the apparatus under combined gravity and barometric actions is identical with that of the apparatus of FIGURE 1 as earlier described. It will be noted from FIGURE 5 that this particular embodiment of the present invention comprises two blocks, an upper block 64 and a lower block 65 which are configured at the abutting portions so as to form the detached type input and output reservoirs (indicated, respectively, by $a(i)$ and $a(o)$) between the two blocks and so that the lower block 65 forms a pedestal upon which upper block 64 rests. It will also be noted that the input and output feedpaths (indicated in each case by A) are circular bores in block 64 which extend from the reservoirs up to the exposure surface 63 which forms the base of cavity 66 at the upper end of block 64. These input and output feedpaths are termed "feedbores" and it will be seen that the input feedbore, extending from the input reservoir, enters exposure surface 63 at center in circular depression 68 and that the output feedbore, extending from the output reservoir, enters exposure surface 63 at periphery in annular depression 67. In addition to input and output reservoirs, feedbores and exposure surface 63 which have counterpart in apparatus 50 of FIGURE 4 it will be noted that the apparatus of FIGURE 5 has also a borehole 62 leading from the output reservoir to the outside of block 65, a borehole 60 connecting input and output reservoirs and a channel 61 from the input reservoir to the outside of block 65. Boreholes 60 and 62 and channel 61 do not have counterpart in apparatus 50 of FIGURE 4 but have only subsidiary function with regard to feeding, discharging and starting the apparatus which will become apparent later from the description accompanying FIGURE 11. With regard to the location of the feedbores with respect to surface 63 it will be readily understood that the locations of the input and output feedbores could be interchanged without affecting the basic configuration.

This is to say the input feedbore could make peripheral entry into surface 63 while the output feedbore makes central entry, instead of the reverse as shown in FIGURE 5, but in which case surface 63 would slope downward from the edge to the center, instead of from the center to the edge as shown. From an operational point of view a central entry of the input feedbore is preferred if the liquid material to be vacuum treated contains a sufficient quantity of gas to cause violent spraying of the material on entry into the vacuum chamber thus creating a "fountain" effect at the outlet of the input feedbore. On the other hand, a peripheral entry of the input feedbore is preferred if the amount of contained gas is such that the spraying action is relatively subdued. Of course it will be appreciated that other factors such as feed rate and vacuum system pumping capacity in addition to gas content also partly determine the extent of the spraying action. Other aspects of exposure surface 63, for example the significance of annular depression 67, will be discussed later in connection with FIGURE 11.

For present purposes, which are to point up the versatility and simplicity of the constructional method in accordance with the present invention, the main concern is with the constructional aspects of the apparatus of FIGURE 5. In this connection it will be readily understood that, assuming a suitable machinable constructional material is available, blocks 64 and 65 are easily fabricated by simple, conventional machining techniques. Of course if the apparatus of FIGURE 5 is to be used for cold vacuum treatment purposes many more suitable materials are available for the fabrication than if the apparatus is to be used for hot vacuum treatment purposes, as already explained and as will be further explained later, but for both purposes probably the most difficult requirement to meet is for an ability to withstand corrosion and erosion by the circulating liquid material. In respect of such corrosion and erosion difficulties it is worth noting that the apparatus of FIGURE 5 is at some disadvantage because of the relatively small cross-sectional areas of the feedbores in relation to the exposure surface area, implying relatively high velocity flow along the feedbores. However it should also be noted that the problem of undue erosion in the feedbores may be economically overcome in some instances by use of tubular inserts in the feedbores either of erosion resistant material or of a form that frequent replacement is feasible. Notwithstanding such possibilities of simple adaptation of the A$a$A$a$ type apparatus of FIGURE 5 to overcome erosion problems as exampled above it may be generally stated that apparatus of the A$a$A$a$ type is best suited for use where erosion difficulties are not severe. It should be recognized that the problems due to erosion and corrosion are not necessarily only in the effects of loss of material on the function of the apparatus but can also, and often more importantly, be in the undesirable inclusion of corroded or eroded material from the vacuum apparatus in the vacuum treated liquid material. Hence the importance of giving proper consideration to corrosion and erosion effects in the design of vacuum treatment apparatus will be understood.

Figure 6:
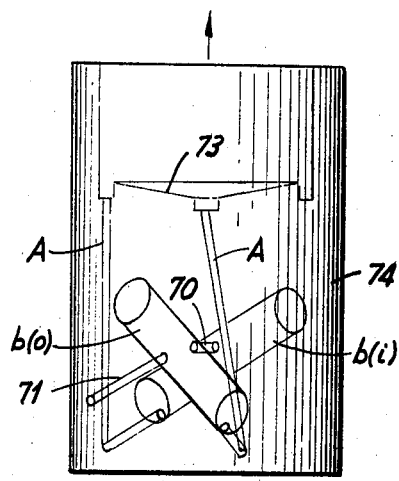

Attention is now directed to FIGURE 6 which illustrates in transparent view apparatus in accordance with the present invention of type A$b$A$b$ which is to say identical in types of reservoirs and types of feedpaths with apparatus 51 of FIGURE 4. It will be noted that the apparatus of FIGURE 6 comprises a single block 74 which integrally contains input and output reservoirs (indicated respectively by $b(i)$ and $b(o)$), input and output feedpaths (indicated in each case by A) and exposure surface 73. The input and output reservoirs are cylindrical cavities, formed by boring into block 74 from the side at an angle to the base, terminating at the lower ends in smaller but similarly formed cavities which join into the feedpaths at the lower extremities. The input and output feedpaths are boreholes extending downward from, respectively the periphery and the center of surface 73; it will be apparent that, as in the case of FIGURE 5, the entry locations of the input and output feedbores into surface 73 could be interchanged without affecting the basic configuration. Borehole 70 which interconnects the input and output reservoirs and borehole 71 which connects the output reservoir with the outside of block 74 do not have counterpart in apparatus 51 of FIGURE 4 but have only subsidiary function in connection with discharging and starting the apparatus as will be apparent later in connection with FIGURE 11. In line with previous remarks concerning erosion difficulties with the A$a$A$a$ apparatus of FIGURE 5 it will be noted that the A$b$A$b$ apparatus of FIGURE 6 has almost identical difficulty due of course to the identity of the feedpath types in the two apparatuses. However, whereas in the A$a$A$a$ apparatus of FIGURE 5 the erosion difficulty may in some circumstances be overcome, as already pointed out, by tubular inserts in the feedbores, this adaptation is not so easily applied to apparatus of FIGURE 6 since the feedbores do not pass through the block at the lower end so as to allow the inserts to be easily secured against the tendency to float or be washed out of position. Hence, although the erosion difficulties with the apparatus of FIGURE 6 are by no means insurmountable (for example, an erosion resistant lining can be coated to the feedbore surfaces by method such as pyrolitic coating) a price is paid in terms of difficulty of combatting erosion problems for the convenience of constructing the apparatus out of one block rather than out of two as in FIGURE 5. However, this convenience of constructing a vacuum apparatus out of a single block is a considerable one since apart from being somewhat more economical the apparatus so constructed is somewhat more rugged and compact, is somewhat more easily supported and, as will appear later in connection with hot vacuum treatment purposes, is somewhat more easily heated than apparatus comprising more than one block. It will of course be understood that a choice between the apparatus of FIGURE 5, the apparatus of FIGURE 6, and other apparatuses not yet detailed for a particular use will depend upon evaluation of advantages and disadvantages applying to the particular use. In such an evaluation other factors not yet mentioned will also have significance and some of these other factors will be brought out below in other descriptions of apparatus in accordance with the present invention.

Figure 7:
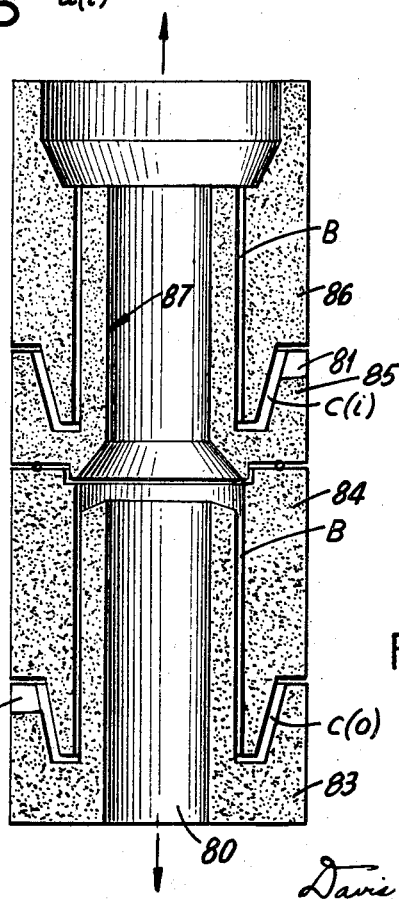

Attention is now directed to FIGURE 7 which illustrates in cross-sectional view an apparatus in accordance with the present invention of the B$c$B$c$ type which is to say identical in respect of types of reservoirs and types of feedpaths with apparatus 52 of FIGURE 4. The apparatus of FIGURE 7 comprises four blocks—two lower blocks 83 and 84 and two upper blocks 85 and 86—the input reservoir (indicated by $c(i)$ and the input feedpath (indicated by 3) being formed by annular gaps between blocks 85 and 86 and the output reservoir (indicated by $c(o)$) and the output feed path (indicated by B) being formed by annular gaps between blocks 83 and 84. Channels 81 and 82 have no counterpart in apparatus 52 of FIGURE 4 but are merely for convenience in feeding and discharging, as will be explained later. Orifice 80 which also has no counterpart in apparatus 52 of FIGURE 4 is an optional feature for allowing attachment of an additional vacuum pumping system so as to increase the vacuum pumping rate. From previous remarks concerning the apparatuses of FIGURES 5 and 6 it will be readily understood that an advantage of the B$c$B$c$ apparatus of FIGURE 7 is in the annular feedpaths which, having relatively large cross-sectional area, reduce erosion difficulties, and that a disadvantage is in the relative complexity of the construction requiring four blocks. Other advantages are in the facility with which the vacuum pumping rate is increased by provision of optional orifice 80 and in the vertical nature and comparatively large area of exposure surface 87. These latter advantages are valuable if, for example, a high degree of gas removal is the primary purpose of the vacuum treatment. In this connection, the larger gravity drop of vertical surface 87, as compared, for example, to the smaller gravity drop of surface 73 of FIGURE 6, provides a thinner film of liquid over the exposure surface for a given flow rate and additional pumping orifices 80 allows attainment of a lower vacuum pressure, both these factors contributing to a greater degree of gas removal. However, further in this connection, it should be noted that the tubular configuration of exposure surface 87 impedes the direct access of volatilized solid impurities to condensing surfaces, as will be explained later, and hence is at some disadvantages with respect to solid impurity removal; further yet, additional pumping orifice 80 substantially increases the vacuum pumping rate only for very low vacuum pressures at which the mean free path of the gas molecules becomes of the same order as the internal dimensions of the apparatus and hence is not a worthwhile addition for the moderately high vacuum pressures most commonly used for vacuum treatment. From the above remarks it will be understood that the advantages and disadvantages of the apparatus of FIGURE 7, in the same way as the advantages and disadvantages of the apparatuses of FIGURES 5 and 6, need to be weighed one against the other in relation to the particular use intended.

Figure 8:
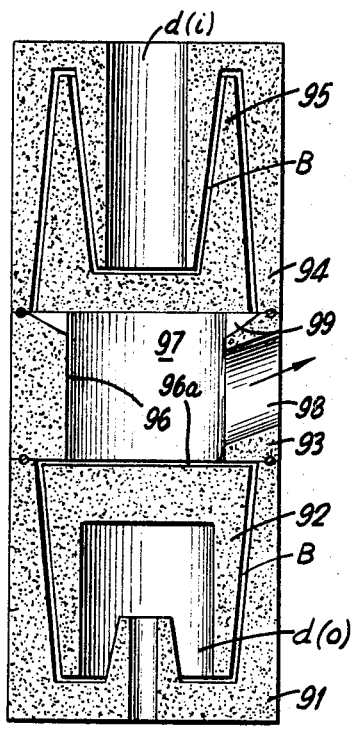

Attention is now directed to FIGURE 8 which illustrates in cross-sectional view an apparatus in accordance with the present invention of type B$d$B$d$ which is to say identical in types of reservoirs and types of feedpaths with apparatus 53 of FIGURE 4. The apparatus comprises five blocks—two lower blocks 1 and 92, a middle block 93 and two upper blocks 94 and 95. The input reservoir (indicated by $d(i)$) and the input feedpath (indicated by B) are formed in blocks 94 and 95 and the output reservoir (indicated by $d(o)$) and output feedpath (indicated by B) are formed in blocks 91 and 92. The exposure surfaces 96 and 96$a$ which is to say the surfaces over which the liquid flows in passage through chamber 97, are composed of the inner surface of block 93 with the exception of pumping orifice 98 and of the upper outer surface of block 92. Pumping orifice 98 is inclined upwards from inside to outside of block 93 to discourage liquid entering chamber 97 from the input feedpath from entering the vacuum pumping system. The main features of the B$d$B$d$ apparatus of FIGURE 8 relevant to advantages and disadvantages this apparatus might have, compared to the A$a$A$a$, A$b$A$b$, and B$c$B$d$ apparatuses of FIGURES 5, 6 and 7, respectively, are as follows: insofar as erosion difficulties are concerned, the feedpath type being annular places the apparatus of FIGURE 8, like the apparatus of FIGURE 7, at an advantage over the apparatuses of FIGURES 5 and 6 which have tubular feedpaths. Insofar as the attributes of the exposure surface configuration are concerned the almost full enclosure of surface 96 by chamber 97 and the top peripheral entry of the input feedpath into chamber 97 form an arrangement particularly suited to treatment of liquids containing relatively large quantities of gas and from which a relatively modest degree of gas removal is required. This is to say the arrangement of FIGURE 8 is well adapted to containing the violent spraying action of heavily gas contaminated liquid directed into chamber 97 by peripheral chamfer 99 around the top inside edge of block 93; that the degree of gas removal under their circumstances be relatively modest implies that the vacuum pressure inside chamber 97 is high enough that the size of orifice 98 is not at all critical and hence it can be of small size as compared to the pumping orifices of FIGURES 5, 6 and 7. It will be understood of course, in light of previous remarks, that because of the restricted access of chamber 97 and surfaces 96 and 96$a$ to condensing surfaces the B$d$B$d$ apparatus of FIGURE 8 is not adapted to efficient removal of volatile solid impurities. Apart from having advantage as outlined above for efficient partial gas removal from heavily gas contaminated liquid B$d$B$d$ apparatus of FIGURE 8 has advantage for some purposes in having top entry and bottom exit for the feeding and discharging of the liquid material as opposed to the side entry and exit A$a$A$a$, A$b$A$b$, and B$c$B$c$ apparatuses. This advantage is considerable, if for example, floor area is restricted and a vertical arrangement of associated apparatuses is consequently the most convenient.

Having outlined above some of the advantages and disadvantages of the four basic types of vacuum treatment apparatus, which is to say the four apparatuses each having identical input and output reservoir types and identical input and output feedpaths types namely A$a$A$a$, A$b$A$b$, B$c$B$c$ and B$d$B$d$ apparatuses, it may now be pointed out that in certain circumstances some advantages may be gained and some disadvantages removed by combining one type of input reservoir with another type of output reservoir or combining one type of input feedpath with another type of output feedpath. In this connection attention is now directed to FIGURES 9 and 10 both of which illustrate vacuum treatment apparatuses, in accordance with the present invention, of the "hybrid" type which is to say apparatuses having different types of input and output reservoirs and different types of input and output feedpaths.

Figure 9:
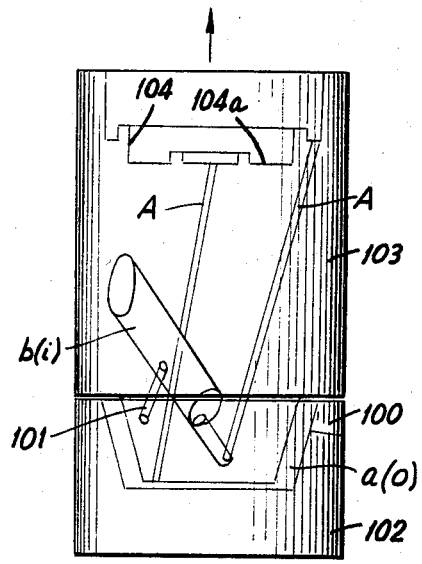

FIGURE 9 illustrates in transparent view an apparatus in accoradnce with the present invention of type A$b$A$a$ identical in respect of reservoir types and feedpaths types with apparatus 54 of FIGURE 4 but with the input and output arrangements reversed. The apparatus comprises two blocks—a lower block 102 and an upper block 103—the input reservoir (indicated by $b(i)$) and input and output feedbores (each indicated by A) being integrally contained in block 103, and the output reservoir (indicated by $a(o)$) being formed between blocks 102 and 103. Borehole 101, which connects the input and output reservoirs, and channel 100, which connects the output reservoir with the outside of block 102, do not have counterpart in apparatus 54 of FIGURE 4 but as will be explained later in connnection with FIGURE 11, have merely subsidiary function in starting and discharging the apparatus. The purpose of FIGURE 9 apart from serving as a typical example of a "hybrid" type vacuum treatment apparatus in accordance with the present invention, is, as already stated, to point up typical advantages to be gained from such hybrid arrangements. A typical such advantage of the A$b$A$a$ apparatus of FIGURE 9 is in the greater flexibility of arrangement of the relative levels of the upper end of the input and output feedbores than is available in the A$a$A$a$ or A$b$A$b$ apparatuses and thereby in the greater flexibility of arrangement of the configuration of the exposure surface for particular purposes. This flexibility is to be seen in FIGURE 9 by the provision of both vertical and horizontal section 104 and 104$a$ in the exposure surface. It will readily understood that the same advantage would still apply if the entry locations of the input and output feedbores into the exposure surface were interchanged and if of course the exposure surface were appropriately reconfigured.

Figure 10:
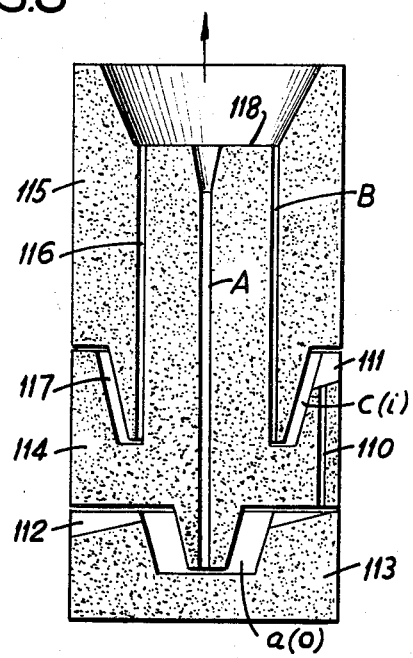

Attention is now directed to FIGURE 10 which illustrates in cross-sectional view an apparatus in accordance with the present invention of the type B$c$A$a$ which is to say identical reservoir and feedpath types with apparatus 56 of FIGURE 4, but with the input and output arrangement reversed. The apparatus is composed of three blocks—a lower block 113, a middle block 114 and an upper block 115—the input reservoir (indicated by $c(i)$) and the input feedpath (indicated by B) being formed by annular gaps between blocks 114 and 115, the output feedpath (indicated by A) being a borehole through block 114, and the output reservoir (indicated by $a(o)$) being formed between blocks 113 and 114. Borehole 110, which connects the input and output reservoirs, and channels 111 and 112, which connect the input and output reservoirs with the outsides of blocks 114 and 113 respectively have merely subsidiary function in starting, feeding and discharging the apparatus as will be explained later in connection with FIGURE 11. The main advantage of the apparatus of FIGURE 10 lies in the fact that in some cases if the liquid to be vacuum treated contains volatile impurities which are largely responsible for the corrosion and erosion problems, these impurities being substantially removed by the vacuum treatment, then the corrosion and erosion problems are much more severe in the input feedpath than in the output feedpath. Hence in such a case the BcAc apparatus of FIGURE 10, which combines an annular type input feedpath with a tubular type output feedpath, provides an adequate solution to erosion and corrosion problems and is more economical in block use than, for example, the BcBc apparatus of FIGURE 7 which has both input and output feedpaths of the annular type.

Attention is now directed generally to FIGURES 5–10. and it will be noted from FIGURES 5–10 that the common constructional feature of the apparatuses shown in the "block type" construction. This is to say, for example, that if suitable, machinable, constructional material is available in the form of cylindrical blocks each of the apparatuses 5–10 may be fabricated from one or more of these cylindrical blocks. It will be understood of course that the apparatuses 5–10 could also be fabricated from block(s) cast in to appropriate configuration or from block(s) in part cast and in part machined into appropriate configuration. It will also be understood that cylindrical outer shape and circular symmetry of inner configuration as shown in FIGURES 5–10 are features of convenience rather than necessity and that rectangular or other outer shape could be used and inner circular symmetry could be avoided without departing from the "block type" constructional method and without signifiicantly affecting the operation of the apparatus. Hence altogether it will by now be understood that the block type constructional method of fabricating "cold" vacuum treatment apparatus, as illustrated by way of representative example in FIGURES 5–10 using block(s) having cylindrical outer shape and varying degrees of inner circular symmetry, may be used to fabricate any of the sixteen forms of "cold" vacuum treatment apparatus discussed earlier in connection with FIGURE 4 using blocks of cylindrical, rectangular or other external shape and having circularly symmetric or other inner configuration. Further, it will be understood that a multiplicity of factors, some of which have been outlined above in connection with FIGURES 5–10, varying with the application at hand, will determine which particular type of apparatus is preferred.

The adaptation of "block type" cold vacuum treatment apparatuses in accordance with the present invention, as described above, to "hot" vacuum treatment purposes will now be described. As mentioned earlier the main advantage of the "block type" constructional method is in the facility with which "cold" vacuum treatment apparatuses so constructed adapt to "hot" vacuum treatment purposes.

Figure 11:
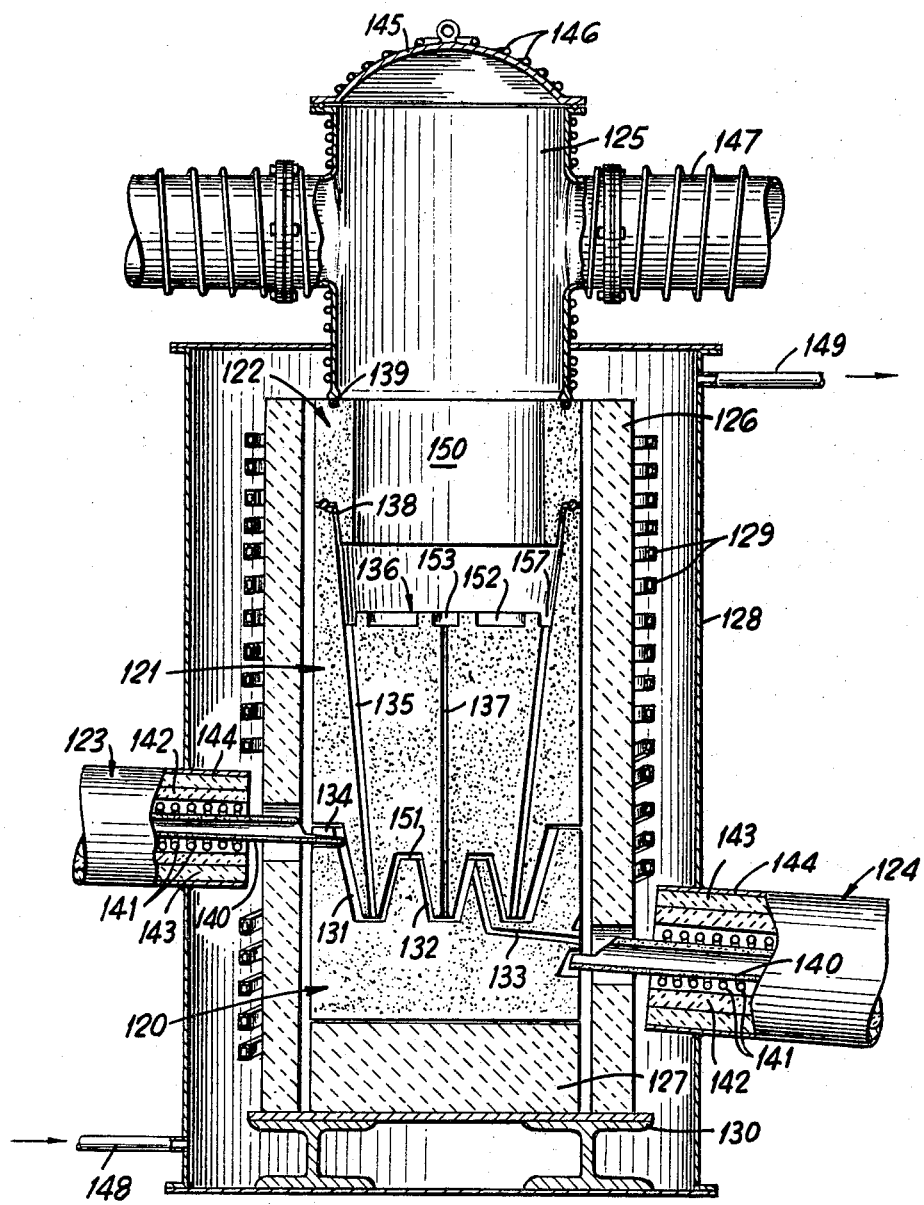
FIGURE 11 is a cross-sectional view of a typical "hot" vacuum treatment apparatus in accordance with the present invention.

Attention is now directed to FIGURE 11 which shows in cross-sectional view a complete vacuum treatment apparatus, for vacuum treating molten copper, in accordance with the present invention. The apparatus of FIGURE 11 comprises essentially a "block type" "cold" vacuum treatment apparatus, as earlier described, adapted to "hot" vacuum treatment purposes by special feeding, discharging, heating and enclosing means. With reference to FIGURE 11: reservoir block 120, feed block 121 and extension block 122 comprise a block type "cold" vacuum treatment apparatus as earlier described; 123 is the input launder and 124 is the output launder; 125 is the vacuum manifold; 126 is the heat insulating shell; 127 is the heat insulating base; 128 is the enclosure; 129 is the induction heating coil and 130 is the support platform. In further detail of blocks 120, 121 and 122, 131 is the input reservoir formed between blocks 120 and 121, 132 is the output reservoir formed between blocks 120 and 121, 133 is the discharge borehole connecting output reservoir 132 to the outside of block 120, 134 is the feed channel connecting the outside of block 120 to input reservoir 131, 135 is one of twelve equally spaced input feed bores connecting input reservoir 131 to vacuum exposure surface 136 of block 121, 137 is the output feedbore connecting exposure surface 136 to output reservoir 132, 138 is the lower vacuum sealing ring between blocks 121 and 122 and 139 is the upper vacuum sealing ring between block 122 and vacuum manifold 125. In further detail of launder 123 and identically of launder 124, 140 is the launder tube, 141 is the resistance heating element, 142 and 143 are heat insulating shells and 144 is the launder enclosure. In further detail of vacuum manifold 125, 145 is the removable cover, 146 is a water cooling cooling tube and 147 is one of two flanged pipe connections to the vacuum pumping system which is not shown in FIGURE 11. In further detail of enclosure 128, 148 is the nitrogen inlet pipe and 149 is the nitrogen outlet pipe.

With further reference to FIGURE 11 the important preferred constructional materials are as follows. Blocks 120, 121 and 122 are of low porosity, high structural strength, compacted graphite, for example of the type of graphite sold under the trade designation ATL by the Union Carbide Corporation. Insulating shell 126 is of any refractory material having good heat insulating properties. Insulating base 127 is of similar material to shell 126 but with the further requirements of good structural strength and stability. Launder tubes 140 are of compacted graphite of almost any grade showing reasonable structural strength and low mechanical erosion by molten copper. Vacuum manifold 125, enclosure 128, platform 130 and launder enclosures 144 are of steel. Vacuum sealing ring 138 is of molybdenum and vacuum sealing ring 139 is of nickel.

With yet further reference to FIGURE 11 the operation of the aparatus is as follows. Assuming that the apparatus is in empty condition as shown, that the entire apparatus is cold which is to say no power is supplied to launder heating elements 141 and induction heating coil 129, and that the inside of the apparatus is at atmospheric pressure which is to say the vacuum pumping system is turned off and nitrogen is not being supplied to enclosure 128, the first step in starting the apparatus is to purge enclosure 128 of air by supplying nitrogen to inlet 148 so as to flow out through outlet 149 maintaining a slightly greater than atmospheric pressure of nitrogen in enclosure 128. It may be noted that nitrogen will also flow out of enclosure 128 via launder tubes 140 and these may be assumed to be sealed off or restricted in some way by further apparatus connected thereto, in the case of input launder 123 by apparatus for supplying molten copper to be treated and in the case of output launder 124 by apparatus for receiving the vacuum treated molten copper. It may be further noted that in order for nitrogen to enter and purge the vacuum exposure chamber 150 the vacuum pumping system needs to be vented to atmosphere and that this is done is also assumed. Once the apparatus is purged of air and filled with nitrogen the next step in the starting procedure is to supply power to launder heating elements 141 and induction coil 129 so as to heat launders 123 and 124 and blocks 120, 121 and 122 to operating temperature which is approximately 2200° F. Coincident with supplying power, the water cooling coils 146 and induction coil 129 which is water cooled are of course supplied with cooling water the water flow then being maintained. After operational temperature has been reached throughout, as determined by readings from thermocouples placed at various locations in the apparatus but not shown in FIGURE 11, the third step in the starting procedure is to commence feeding molten copper to input launder 123 and thence into input reservoir 131. It will be noted from FIGURE 11 that input reservoir 131 and output reservoir 132 are connected by gap 151 between blocks 120 and 121 and so it will be further noted that, with vacuum exposure chamber 150 at about atmospheric pressure, molten copper flowing into reservoir 131 eventually overflows through gap 151 into reservoir 132 until reservoir 132 itself overflows into borehole 133 and thence down output launder 124. When molten copper supplied initially to launder 123 as in step three above issues from borehole 133 into launder 124 the fourth step in the starting procedure, which is to switch on the vacuum pumping system, is implemented. The vacuum pumping system being switched on, as nitrogen is exhausted from chamber 150 by the vacuum pumping system and the pressure in chamber 150 is consequently reduced, molten copper rises in feed bores 135 and 137. At this point it should be noted that the capacity of reservoir 131 is something over twice the capacity of the twelve feed bores 135 and the capacity of reservoir 132 is at least greater than the capacity of feed bore 137. This is to say, with reservoir 131 full to the point that it overflows through gap 151, with reservoir 132 full to the point that it overflows through discharge borehole 133 and with chamber 150 being at about atmospheric pressure, that when the pressure in chamber 150 is reduced to the order of one millimeter of mercury molten copper rises fully in feedbores 135 and almost fully in feedbore 137 reducing the amounts in reservoirs 131 and 132 to, respectively, something greater than a half and something greater than a quarter of the overflow amounts. These residual amounts in reservoirs 131 and 132 are of course not critical so long as they are sufficient, bearing in mind changes in capacities of reservoirs and feed bores with prolonged use due to erosion, to prevent emptying of the reservoirs and consequent loss of the molten copper barometric vacuum seal during the starting procedure. At this point it should further be noted that the vertical height of feedbores 135 and 137 as measured from exposure surface 136 to a horizontal line through the overflow surface of gap 151, is an inch or so less that the barometric height of molten copper which is about 47 inches. This is to say that, since the overflow level of reservoir 131 through gap 151 is two or three inches above the overflow level of reservoir 132 through borehole 133, molten copper fed into reservoir 131 will flow up feed bores 135 across exposure surface 136 and down feed bore 137 into reservoir 132 and then out of borehole 133, rather than overflowing through gap 151, so long as the pressure in vacuum exposure chamber 150 is not greater than the equivalent of an inch or so of molten copper. This is further to say that with molten copper fed continuously to reservoir 131 from launder 123 and with a pressure of about one millimeter of mercury in chamber 150 molten copper circulates from reservoir 131 up feed bores 135, across exposure surface 136, down feed bore 137, into reservoir 132, out of borehole 133 and down launder 124, the molten copper level in reservoir 131 automatically maintaining at an inch or so below the overflow level through gap 151. As will by now be apparent, the fourth step in the starting procedure of switching on the vacuum pumping system as detailed above—is the final step and the apparatus of FIGURE 11 having been thus started is in continuous operation, vacuum treating molten copper continuously so long as molten copper is continuously supplied to launder 123.

With yet further reference to FIGURE 11 and having already described the construction, starting procedure and basic operating principles, further general details and advantages of the apparatus of FIGURE 11 will now be described. It may now be pointed out that blocks 120, 121 and 122 constitute a "block type" vacuum exposure apparatus which while broadly similar to the "block type" apparatuses discussed in connection with FIGURES 5–10 and in relation to FIGURE 4 is not of a form previously discussed. This is to say the apparatus composed essentially of blocks 120 and 121 (block 122 is not essential as will be explained later), does not correspond to any of the ten forms of apparatus of FIGURE 4 nor to any of the six forms of apparatus related to the apparatuses in FIGURE 4 but not shown in FIGURE 4, namely apparatuses signified by A$b$A$a$, B$c$A$a$, B$d$A$a$, B$c$A$b$, B$d$A$b$ and B$d$B$c$. However it will be noted by comparing FIGURES 10 and 11 that blocks 120 and 121 of FIGURE 11 compose an apparatus somewhat similar to the apparatus of FIGURE 10 which is of type signified by B$c$A$a$. With reference to FIGURE 10 it will be noted that this B$c$A$a$ apparatus is composed of three blocks 113, 114 and 115, and that the annular feed 116 (also marked B) which connects the input reservoir 117 with the exposure surface 118 is formed between an inner surface of 114 and an outer surface of block 115. With reference now to FIGURE 11 it will be noted that the counterpart of annular feed 116 of FIGURE 10 are twelve feed bores 135 in block 120 of FIGURE 11. Hence it will be further noted that the use of a number of feed bores in a single block as in block 120 of FIGURE 11, instead of an annular feed gap as between blocks 114 and 115 of FIGURE 10, allow an external input reservoir type of arrangement (signified by "$c$") which in association with a detached output reservoir type of arrangement (signified by "$a$") requires the use of only two blocks for the complete apparatus as in FIGURE 11, instead of three blocks as in FIGURE 10. This is to say, generally speaking, that annular feed (signified by "B") can be replaced by multiple tubular feed in "B" type apparatuses with advantage in some cases, that for apparatuses constructed from blocks in accordance with the present invention fewer blocks are required. A convenient designation for multiple tubular feed, as in the apparatus of FIGURE 11, is "$m$A", and accordingly the apparatus formed by blocks 120 and 121 of FIGURE 11 is signified by "$m$A$c$A$a$." Hence it will be understood that a further group of "cold" vacuum treatment apparatuses in addition to the sixteen previously discussed in connection with FIGURE 4 are made possible by the simple expedient of replacing "annular feed" with "multiple tubular feed" and that this further group may have particular advantage in particular circumstances if the apparatuses are of "block type" construction in accordance with the present invention, as typified by the apparatuse of FIGURE 11. Hence, moreover, it will by now be anticipated that by other such simple expedients as replacing annular feed by multiple tubular feed yet further groups of "cold" vacuum treatment apparatus may be devised having particular advantages in particular circumstances if the block of construction in accordance with the present invention is used. Accordingly, returning now to an account of general features and advantages of the apparatus of FIGURE 11 it will be understood that blocks 120 and 121 are merely representative of a very large number of possible block arrangements serving substantially the same vacuum treatment purpose and that therefore the following remarks may be taken to have general application.

The choice of graphite for the construction material of blocks 120, 121 and 122 is for a number of well known reasons. Firstly, graphite is an excellent refractory material having good structural strength and dimensional stability at molten copper temperatures. Secondly, graphite reacts with molten copper only to the extent that the copper contains oxygen and has high resistance to mechanical erosion by molten copper. Thirdly, graphite is electrically conductive to a degree that readily allows induction heating as by coil 129. Fourthly, graphite is readily machinable by ordinary metal working methods. Lastly, graphite is commercially available in large blocks and suitable grades at relatively low cost. Of these five reasons for choosing graphite, the third—the fact that graphite is electrically conductive and therefore amenable to induction heating—is the least important since although induction heating is a convenient heating method, other heating methods not relying on electrical conductivity of the blocks 120, 121 and 122 may of course be used; for example resistance heating elements disposed between blocks 120, 121 and 122 and insulating shell 126 would serve adequately. The fourth and fifth reasons—the fact that graphite is readily machinable and available in large sizes at relatively low cost—are also of less importance than the first two since, as already pointed, blocks such as blocks 120, 121 and 122 may be fabricated by methods other than simple machining and cost is of significance only in relation to service in prolonged use. Accordingly, it may be stated that although graphite is the preferred constructural material for blocks 120, 121 and 122, any other material having good structural strength and stability at molten copper temperatures and substantially non-reactive with and negligibly eroded by molten copper would serve adequately. Notwithstanding the many desirable properties of graphite for the present purpose as detailed above there is one undesirable property which needs to be mentioned. This undesirable property is porosity which is to say that the pressure gradient between the low pressures inside the block structure, in chamber 150 for example, and the approximately atmospheric pressure outside the block structure, between shell 126 and block 122 for example, causes nitrogen to flow through the graphite, through block 122 for example. The extent of this porosity and hence the amount of nitrogen flow through the graphite varies a great deal from one grade of graphite to another and hence is a factor in choosing the grade of graphite to be used. In any case, whatever the porosity of the grade of graphite is used, this porosity can be greatly reduced by painting the outside of blocks 120, 121 and 122 with a colloidal dispersion of graphite particles in water, sold under the trade name "Aquadag" while maintaining a low pressure inside blocks 120, 121 and 122. Hence this painting procedure is a worthwhile step during the construction of the apparatus. The small residual porosity of the graphite after Aquadag painting is generally of little consequence to the operation of the apparatus in view of the high pumping capacity of the vacuum pumping system and the fact that large quantities of gas are constantly evolved from the molten copper as it flows through the vacuum treatment chamber. That the gas which flows through the graphite, due to porosity of the graphite, into chamber 150 and elsewhere be inert to molten copper is of course important and this is primarily the reason for maintaining the nitrogen atmosphere in enclosure 128, although a further reason is that nitrogen is also inert to hot graphite. Insofar as the difficulties with hot vacuum treatment apparatus mentioned in the introduction are concerned, namely those due to high temperatures, high temperature and pressure gradients and corrosive effects, it will be noted that the apparatus of FIGURE 11 is virtually free of these difficulties due mainly to the desirable properties of the graphite and the block type of construction, which require a "hot to cold" vacuum seal only at the upper end of block 122 which is removed from the molten copper and can therefore operate at a temperature somewhat less than that of molten copper. In this connection it should be noted that block 122 is included in FIGURE 11 only to illustrate one method of enlarging chamber 150 in a vertical direction for, among other reasons to be discussed later, minimizing the difficulty of making the "hot to cold" vacuum seal between the block assembly and the vacuum manifold. It will be apparent that with minor reorientation of feed bores 135, block 122 could be dispensed with and the same chamber size attained by extending block 121. If block 121 were so extended the necessity for block 122, for a vacuum joint between blocks 121 and 122 and for sealing ring 138 would of course be dispensed with; however, such a vacuum joint gives little trouble if the mating surfaces of blocks 121 and 122 are flat and smooth, if molybdenum sealing rings 138 is properly sized and if the joint is impregnated with "Aquadag." Hence, with the understanding that the necessity for a vacuum joint between blocks 121 and 122 may be dispensed with by dispensing with block 122 and extending block 121, the only critical joint in the entire apparatus is the "hot-cold" joint between block 122 and vacuum manifold 125. With respect to the difficulty of making this joint it will be noted from FIGURE 11 that water cooling coils 146 carry down the vacuum manifold 125 almost to the lower extremity where the metal thickens out to provide a flat machined surface for mating with the upper surface of block 122. Although the lower part of block 122 is at a temperature of between 2000° F. and 2200° F., in the region of contact with manifold 125 the temperature of block 122 is considerably less than 2000° F. due to the loss of heat to the water cooled vacuum manifold 125. This is to say the temperature of the vacuum joint itself and of nickel vacuum sealing ring 139 does not generally exceed 1000° F. at which temperature problems due to difference in thermal expansion between the steel of manifold 125 and the graphite of block 122 are not excessive. The use of nickel sealing ring 139 to complete the vacuum joint is according to the well known vacuum art practice of using such a ring to increase the sealing pressure by distributing the sealing force over a small area. With a block diameter of about 4 feet the sealing force, due to atmospheric pressure, is about 20,000 pounds and so it will be readily understood that the sealing ring 139 becomes embedded in the upper surface of block 122. The cross-sectional diameter of the sealing ring is generally chosen so that the ring embeds to full depth, assuming the upper surface of block 122 to be flat to start with, and so that therefore the flat lower surface of manifold 125 seats on the flat upper surface of block 122 but also so that the main vacuum seal is due to the very high pressure contact between the sealing ring 139 and both the lower surface of manifold 125 and the upper surface of block 122.

It should be noted that whereas the joint between manifold 125 and block 122 is far enough removed from exposure surface 136 to be out of reach of molten copper, the joint between blocks 121 and 122 is somewhat accessible to molten copper thrown up by the sometimes violent gas issuance from the molten copper flowing out of feed bores 135 and flowing across exposure surface 136; partly for this reason molybdenum is a more suitable material than nickel, which dissolves in molten copper, for sealing ring 138. In connection with the throwing up of molten copper in chamber 150 due to issuing gases, it may be pointed out that such violent gas agitation of the molten copper in the exposure chamber is both an unavoidable and a useful part of the vacuum treatment process, and that the apparatus of FIGURE 11 is well adapted both to coping with and making use of this agitation. As is well known, vacuum treatment of molten copper containing dissolved gases such as hydrogen and volatile impurities such as lead can result in removal of both the gases and the volatile impurities from the molten copper to a degree depending on a number of factors. In the case of the apparatus of FIGURE 11 these factors include the rate of flow of molten copper through the apparatus, the pumping rate of the vacuum pumping system, the area of the vacuum exposure surface 136, the area of cooled surface on vacuum manifold 125 and the geometry of exposure chamber 150 as related to the geometry of vacuum manifold 125. A full discussion of the interrelationship between these and other factors in determining the efficiency of the process is beyond the scope of this specification; however the following points in this respect are of special importance. Firstly, the rate of flow of molten copper through the apparatus is related to the pumping rate of the vacuum pumping system, for a given degree of gas removal, so long as other factors in apparatus design ensure that equilibrium conditions are attained in chamber 150 before the copper exits from the chamber. This is to say that if, for example, the molten copper contains dissolved hydrogen in saturation amount at normal atmospheric pressure and if the rate of copper flow and rate of vacuum pumping together provide for an average pressure in chamber 150 of, for example, 1 mm. of mercury then the amount of dissolved hydrogen in the molten copper exiting from the chamber via feed bode 137 is the saturation amount at 1 mm. pressure only if the other factors in apparatus design are appropriate. This is hence further to say that efficient gas removal, in terms of pumping capacity required per rate of copper flow per degree of gas removal, requires not only that pumping capacity be properly related to rate of copper flow but also that both of these factors be properly related to exposure areas and chamber and manifold geometries. Secondly, the degree of removal of particular gases depends to a large extent on the nature of the gases and the nature of mechanisms by which these particular gases are included in the copper. This is to say, for example, that hydrogen is removed much more readily than sulphur dioxide and that dissolved gases are removed more readily, generally speaking, than occluded gases. This is hence further to say that all factors in apparatus design need to take proper account of both the particular gases to be removed and the mechanisms by which these gases are included in the copper. Thirdly, the removal of volatile impurities such as lead is by somewhat different process than the removal of gases such as hydrogen and, generally speaking, depends somewhat differently on factors in apparatus design. This is to say, for example, that gases may be substantially removed under conditions under which volatile impurities are substantially not removed. This is hence further to say that it is normally extremely difficult to optimize the factors in apparatus design for both gas and volatile impurity removal depending of course on the types of gas and volatile impurity and upon the degree of removal required. From the foregoing it will be readily understood that a discussion of various operating design parameters of the apparatus of FIGURE 11 on a general basis is impossible due to the multiplicity of factors involved. Instead, by way of example of the efficiency of vacuum treatment apparatus in accordance with the present invention, some of the design parameters of the apparatus of FIGURE 11 designed for use with hydrogen-treated electrolytic cathode copper are detailed below.

Hydrogen treated molten copper which is to say molten copper treated so as to contain dissolved hydrogen to the virtual exclusion of all other gases is very readily vacuum treated so as to remove substantially all the dissolved hydrogen and hence so as to provide substantially gas free copper capable of forming castings of the highest density. If the hydrogen treated molten copper is additionally high grade electrolytic copper than the significant volatile impurities lead, tellurium and bismuth may also be substantially removed by vacuum treatment so as altogether to provide substantially gas free, substantially volatile impurity free copper capable of forming castings of the highest density and appropriate for high temperature vacuum use applications such as in electron beam devices where the release of volatile impurities is highly undesirable. The apparatus of FIGURE 11 is ideally suited for the vacuum treatment of molten, hydrogen-treated, electrolytic copper as follows. The configuration of vacuum exposure surface 136 as shown is merely typical of a number of configurations for this surface which serve equally well. The main requirement for the configuration of this surface is that the molten copper entering chamber 150 via feed bores 135 flow uniformly over the exposure surface before leaving chamber 150 via feed bore 137; such uniform flow is provided in the apparatus of FIGURE 11 by furnishing annular depressions 152 and 157 in the upper surface of block 121. Bearing in mind the rather violent agitation of the molten copper due to the hydrogen degassing action the over-all effect of depression 157 is to distribute the flow from the twelve feed bores 135 more or less uniformly around the outer edge of the exposure surface, whereas the overall effect of depression 152 is to gather a stagnant pool of degassed copper over which undegassed copper, being less dense, spreads and flows in a more or less uniform film eventually flowing into circular depression 153 and down output feed bore 137. Generally speaking, the furnishing of a stagnant pool of degassed molten copper, as by furnishing depression 152, as a flow path for molten copper which is in process of degassing is preferred to furnishing a solid surface—surfaces 63 and 73 of FIGURES 5 and 6, respectively, for example—since the liquid pool automatically maintains a horizontal level and since molten copper does not readily wet a graphite surface. The fact that the molten copper does not readily wet a graphite surface can lead to "tracking" of the surface and preferential erosion of the surface which aggravates the "tracking" problem. By "tracking" I mean a partial erosion of the surface by the flowing copper so as to form and undesirable channel or "track" beneath the stream of copper. However, it must be noted in this respect that the violent agitation of the molten copper due to degassing action has itself the effect of distributing molten copper more or less uniformly over the exposure surface and "tracking" is by no means such a problem as it would be without this agitation. Insofar as the area of exposure surface 136 is concerned it will be readily understood that, assuming uniform flow over surface 136, this area in relation to the rate of flow of copper determines the depth of the film of copper that flows over surface 136, again bearing in mind of course the disruptive effect of the agitation due to degassing. Hence it will be readily understood that insofar as the treatment process is affected by the depth of copper flowing over the exposure surface 136 this is determined by the area of surface 136 in relation to the rate of flow of copper. Hence further it will be readily understood that since the removal of volatile impurities is much more affected by the depth of copper flowing over the exposure surface than is the hydrogen removal, the area of the exposure surface is optimized in a particular instance mainly with regard to volatile impurity removal, again, of course, bearing in mind the agitation due to degassing. In this connection it may be noted that, in a typical case, the agitation of the molten copper due to the hydrogen degassing has effect, insofar as volatile impurity removal is concerned, of increasing the area of exposure surface 136 by about a factor of three which is to say, alternatively, of decreasing the depth of copper flowing over surface 136 by about a factor of three. This is to say the coincident removal of hydrogen and volatile impurities can result in a much higher removal of volatile impurities than would result in the same apparatus were the volatile impurities to be removed alone. Hence the importance will be understood of those aspects of the apparatus design which allow effective use to be made of the violent agitation due to hydrogen degassing toward efficient volatile impurity removal, namely a depth and heating of chamber 150 sufficient to allow considerable spraying of molten copper, due to degassing, up the walls of the chamber without solidification on the walls. Also contributing to the efficiency of volatile impurity removal is the disposition in relation to exposure chamber 150 of the cooled surfaces of manifold 125 upon which the released volatile impurities impinge and condense. This is to say it is important that the direct paths between the surfaces of exposure chamber 150 and the cooled surfaces of vacuum manifold 125 be unobstructed over relatively large solid angles; accordingly while chamber 150 should be deep enough properly to accommodate the spraying due to degassing agitation it should be no deeper so as to avoid substantially blocking the direct volatile impurity impingement on the cooled surface of manifold 125.

In summary of the above remarks concerning the optimization of the apparatus of FIGURE 11 for removal of hydrogen and, coincidentally, volatile impurities such as lead, bismuth and tellurium from molten, hydrogen-treated, electrolytic copper, the following figures are preferred. The outer diameter of blocks 121, 122 and 123 is about 4 feet and the rest of the apparatus is proportionately about as shown in FIGURE 11, the rate of flow of molten copper, which is to say the production rate, is 800 pounds per hour; the vacuum pumping rate is about 1500 cubic feet per minute at a pressure of about 100 microns; the volatile impurity removal is about 80 percent and the residual hydrogen is about a tenth of a part per million by weight. The power supplied to induction coil 129 is about 120 kilowatts.

It will by now be understood that apparatus in accordance with the present invention constitutes simple and economic means for vacuum treating molten metals in continuous fashion, particularly hydrogen-treated molten copper. This is to say cold vacuum treatment apparatus of more or less conventional form, as for example discussed with reference to FIGURES 1–4, when fabricated in the "block-method" in accordance with the present invention, as for example discussed with reference to FIGURES 5–11 and when, further, adapted to hot vacuum treatment purposes also in accordance with the present invention, as for example discussed with reference to FIGURE 11, constitutes simple and economic means for removing gases and volatile impurities, or either of them, from molten metals in continuous fashion.

Various simple extensions of the method and apparatus of the present invention will be immediately obvious to those skilled in the metal processing arts such as, for example, the minimization of erosion problems by pyrolytic or other coating of surfaces of the apparatus with erosion resistant material such as boron nitride or by the use of replaceable inserts in critical parts of the apparatus such as feed bores and exposure surface. These and other simple extensions of the method and apparatus of the present invention as well as omissions and departures therefrom fall within the scope of the present invention.

I claim:

1. Molten metal vacuum treatment apparatus having a sequence of interconnected liquid transfer elements, said transfer elements including a barometric input feedpath, a barometric output feedpath, a vacuum exposure chamber between the input feedpath and the output feedpath, and a reservoir, said transfer elements being formed within a set of interfitting blocks of refractory material, each of at least two of said interfitting blocks having a portion at least partially defining a transfer element so that adjacent interfitting blocks cooperate to form one of said transfer elements within the set.

2. Apparatus as in claim 1 having two reservoirs and barometric feedpaths.

3. The apparatus of claim 1 in which said reservoir is a detached input reservoir.

4. The apparatus of claim 1 in which said reservoir is a U-tube input reservoir.

5. The apparatus of claim 1 in which said reservoir is an external input reservoir.

6. The apparatus of claim 1 in which said reservoir is an internal input reservoir.

7. The apparatus of claim 1 in which said reservoir is a detached output reservoir.

8. The apparatus of claim 1 in which said reservoir is a U-tube output reservoir.

9. The apparatus of claim 1 in which said reservoir is an external output reservoir.

10. The apparatus of claim 1 in which said reservoir is an internal output reservoir.

11. The apparatus of claim 1 in which said input feedpath is a single tubular feedpath connecting an input reservoir with an exposure surface.

12. The apparatus of claim 1 in which said input feedpath is a multiple tubular feedpath connecting an input reservoir with an exposure surface.

13. The apparatus of claim 1 in which said input feedpath is an annular feedpath connecting an input reservoir with an exposure surface.

14. The apparatus of claim 1 in which said output feedpath is a single tubular feedpath connecting an output reservoir with an exposure surface.

15. The apparatus of claim 1 in which said output feedpath is a multiple tubular feedpath connecting an output reservoir with an exposure surface.

16. The apparatus of claim 1 in which said output feedpath is an annular feedpath connecting an output reservoir with an exposure surface.

17. Apparatus as in claim 1 in which the block is of graphite.

18. The apparatus of claim 1 wherein said vacuum chamber is partially defined by a bottom wall having depressed regions for holding pools of molten metal in a stagnant condition such that additional molten metal flows over said stagnant metal to prevent erosion of said bottom wall.

19. The apparatus of claim 1 wherein said vacuum exposure chamber is provided with a surface adjacent to the molten metal adapted to permit volatile impurities to condense upon said surface.

20. The apparatus of claim 1 including input and output reservoirs wherein the upper portions of said input and output reservoirs are connected by a passage which allows molten metal to flow by gravity directly from the input reservoir to the output reservoir to fill the output reservoir, thereby providing a molten metal seal for the input and output barometric feedpaths prior to the application of vacuum during start-up of the apparatus.

21. Vacuum treatment apparatus according to claim 1, including at least two blocks of homogeneous material, in which as least a portion of the surface of one block cooperates with at least a portion of the surface of another block to form at least a portion of a transfer element.

22. Vacuum apparatus according to claim 1, including at least two blocks of homogeneous material, at least one of which is provided with an internal passage terminating at a surface of the block, said surface cooperating with at least a portion of a surface of another block to form at least a portion of a transfer element.

23. Molten metal vacuum treatment apparatus according to claim 1 comprising a set of generally solid interfitting blocks of graphite having adjacent surfaces at least partially defining a plurality of transfer elements, at least a portion of said set of blocks being surrounded by an induction heating coil and being enclosed in an oven.

24. The method of making molten metal vacuum treatment apparatus having interconnected liquid transfer elements, said transformer elements including a barometric input feedpath, a barometric output feedpath, a vacuum exposure chamber, and a reservoir, comprising the steps of: forming a set of blocks of refractory materials adapted to interfit; shaping a portion of each of at least two blocks of the set at least partially to define a transfer element; assemblying the blocks of the set in interfitting relation; and aligning the blocks so that the shaped portions cooperate to define at least one transfer element in a sequence of transfer elements including a barometric input feedpath, a barometric output feedpath, a vacuum exposure chamber between the feedpaths at one end of one feedpath, and a reservoir at the other end of said feedpath.

25. The method of claim 24 including the further steps of forming an internal channel within at least one block of the set, aligning the blocks so that the internal channel is in communication with the shaped portion of another block of the set so that the shaped portion cooperates with the internal channel to at least partially define a transfer element.

26. Molten metal vacuum treatment apparatus having an internal sequence of liquid transfer elements including a vacuum exposure chamber and associated input and output barometric feedpaths, at least one of said transfer elements being formed by the cooperation of adjacent surfaces of a set of interfitting generally solid homogeneous refractory blocks, one surface forming a wall of said transfer element and another surface forming another wall of said transfer element.

27. Vacuum treatment apparatus according to claim 26 wherein at least one of said transfer elements is formed by a channel extending through at least one of the blocks of the set.

References Cited

UNITED STATES PATENTS

| | | | | |
|---|---|---|---|---|
| 1,568,331 | 1/1926 | Harris | 239— | 419 |
| 3,179,512 | 4/1965 | Olsson | 164— | 65 X |
| 1,921,060 | 8/1933 | Williams | 266— | 34 |
| 2,054,922 | 9/1936 | Betterton et al. | 266— | 34 |
| 2,140,607 | 12/1938 | Thompson | 164— | 65 |
| 2,587,793 | 3/1952 | Waldron | 266— | 34 |
| 2,734,240 | 2/1956 | Southern | 266— | 34 |
| 2,837,790 | 6/1958 | Rozian | 164— | 64 |
| 2,859,262 | 11/1958 | Harders et al. | 266— | 34 |
| 3,099,699 | 7/1963 | Breuing | 266— | 34 |
| 3,136,834 | 6/1964 | Lorenz | 266— | 34 |
| 3,154,404 | 10/1964 | Lorenz | 266— | 34 |
| 3,310,850 | 3/1967 | Armbruster | 164— | 64 |

FOREIGN PATENTS 793,863  12/1935  France.

J. SPENCER OVERHOLSER, *Primary Examiner.*

R. S. ANNEAR, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,921 September 24, 1968

Thomas Gordon Hart

It is certified that error appears in the above identified patent and that said Letters Patent are hereby corrected as shown below:

Column 4, line 35, after "size" insert -- except --. Column 6, line 1, "that" should read -- than --. Column 13, line 22, "in" should read -- is --. Column 17, line 34, cancel "is"; line 39, "paintaing" should read -- painting --. Column 19, line 8, "bode" should read -- bore --. Column 22, line 53, "transformer" should read -- transfer --; line 59, "assemblying" should read -- assembling --.

Signed and sealed this 3rd day of March 1970.

(SEAL)
Attest:

Edward M. Fletcher, Jr.      WILLIAM E. SCHUYLER, JR.
Attesting Officer      Commissioner of Patents